United States Patent
Cowlard et al.

[15] 3,658,468

[45] Apr. 25, 1972

[54] MANUFACTURE OF COMPOSITE FERRITES

[72] Inventors: Frederick Claud Cowlard; George Ord, both of Ilford, England

[73] Assignee: The Plessey Company Limited, Ilford, England

[22] Filed: Nov. 13, 1970

[21] Appl. No.: 89,337

Related U.S. Application Data

[63] Continuation-in-part of Ser. No. 746,233, July 19, 1968, abandoned, which is a continuation-in-part of Ser. No. 719,878, Apr. 9, 1968, abandoned.

[30] Foreign Application Priority Data

Apr. 11, 1967    Great Britain ...................... 16,414/67
July 27, 1967    Great Britain ...................... 34,565/67

[52] U.S. Cl. ........................... 23/51, 252/62.56, 252/62.62, 252/62.63
[51] Int. Cl. ................................. C01g 49/00, C04b 35/26
[58] Field of Search ...................... 252/62.62, 62.56; 23/51

[56] References Cited

UNITED STATES PATENTS 3,305,349    2/1967    Bovarnick et al. ........................ 75/0.5

*Primary Examiner*—Robert D. Edmonds
*Attorney*—Blum, Moscovitz, Friedman & Kaplan

[57] ABSTRACT

Ferrite powder of consistent good quality and homogeneity is obtained by using nitric acid to form solutions of the nitrate of each of the metals involved, mixing the solutions in the requisite proportions, and decomposing the mixture by spray deposition on the hot surface of an agitated bed of granular material identical with the decomposition product while avoiding any accumulation of liquid, and then calcining the obtained oxide mixture to obtain ferrite powder with a desired proportion of ready-formed ferrite. The nitrous gases formed during solution and decomposition are used for the reconstitution of nitric acid, the tail gas of the reconstitution system being preferably contacted with an aqueous suspension of a basic oxide of a constituent metal of the ferrite, whereafter nitric acid is added to form the required nitrate solution of the constituent metal.

3 Claims, 1 Drawing Figure

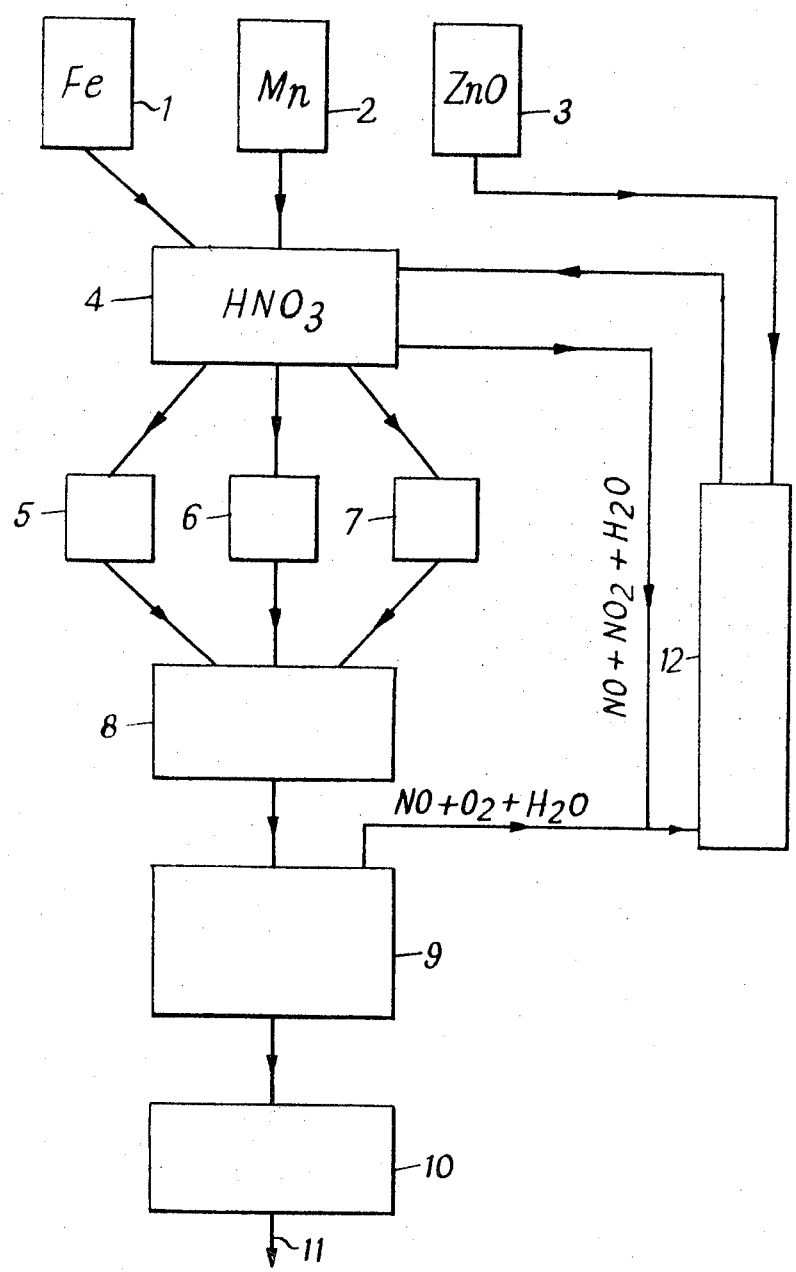

MANUFACTURE OF COMPOSITE FERRITES

This application is a continuation-in-part of our co-pending Application Ser. No. 746,233 filed July 19, 1968, now abandoned, which itself is a continuation-in-part of our Application Ser. No. 719,878 filed Apr. 9, 1968, now abandoned.

This invention relates to the manufacture of composite ferrites and has for an object to provide an improved process for the production of composite ferrites to fairly accurate specifications and with a good degree of homogeneity.

The process hitherto most widely employed to obtain composite ferrites uses as starting materials oxides or carbonates of each of the various metals intended to be present in the ferrite, these oxides or carbonates being ground to a fine powder and mechanically mixed to obtain a mixed powder in which the individual particles of each are as uniformly as possible distributed; this mixed powder is then calcined to cause the carbonates to decompose to oxides and a desired proportion of the oxides to react to form ferrites, an operation which involves sintering, the product thus obtained is pulverized again to obtain a molding material for bodies of desired shape, and these bodies are then finally sintered to complete the reaction and obtain the desired ferrite bodies.

It is, however, difficult to obtain oxides free from alkali metals, and apart from the relatively high cost of oxides of the requisite degree of purity, the method involves considerable uncertainty due to variation from batch to batch of the purity, grain size, etc., of the purchased oxides. In order to reduce these last-mentioned difficulties, it has been proposed to obtain the required oxide mixture by other means, for example by electrolytic co-precipitation of the various metal oxides or chemical co-precipitation as oxalates. The last-mentioned process is, however, limited to batch operation and gelatinous precipitates are formed which again are difficult to purify and filter.

The present invention has for an object to provide an improved method of producing a powder of a ferrite containing a plurality of metals, which method includes the step of heat decomposition of a mixed aqueous solution of nitrates of the various metals to be present in the ferrite, in which decomposition step heat is applied to successive volumes of the mixed nitrate solution in such manner as to ensure the dehydration and decomposition to oxides of each volume before allowing it to make contact with any subsequently introduced volume, the dimensions of each volume being too small to permit any significant segregation of the individual metals during the decomposition. A more specific object is to provide an improved method of this kind which leads itself to execution in apparatus of highly compact form, thereby contributing greatly to the economy of the process. According to the invention the mixed solution is applied in drops, or in the form of the droplets of a spray, on to a heated surface of solid material in the form of a bed of granules subjected to agitation by mechanical means and conveniently constituted by previously produced granules of the desired oxide mixture. This surface is heated to a temperature above the decomposition point of the most stable nitrate present in the solution so that each drop or droplet becomes decomposed to form an intimate mixture of oxide powders of the calculated composition, said mixture generally containing some proportion of spinel-structure ferrites, without giving the more stable nitrates present in the solution a chance of becoming separated from the less stable nitrates. Preferably the resulting mixed powder is removed at the rate at which it is formed, and the removed mixed powder is subjected to further heat treatment to effect or continue conversion of the powder into spinel or magnetoplumbite or related structure, as the case may be, up to such percentage as to form a ferrite powder which after molding and sintering will give a body having desired magnetic properties.

Preferably the nitrates of the individual metals are formed by dissolving each of the metals in question, or a suitable compound or mixture of compounds of such metal, in nitric acid, and the vapors formed as a result of this dissolving step and of the nitrate decomposition step being, together with the developed steam and added air or oxygen, employed for reconstitution of nitric acid which is then reintroduced into the process.

In the reconstitution of nitric acid from the decomposition gases it is necessary, in order to avoid health risks, to remove nitrous gases from the exhaust down to a low percentage, and while this hitherto required the provision of a relatively high number of absorption columns, this number can, according to a feature of the invention, be considerably reduced in the case of the manufacture of ferrites containing a metal having a basic oxide, more particularly zinc or barium, by supplying that metal in the form of its basic oxide, and causing the tail gases of the absorption system to pass through a dispersion of this oxide, preferably bubbling it through a dispersion in water, the dispersion being converted to the corresponding nitrate or nitrite, the solution then being used in the manufacture of the ferrite powder.

The method of the invention is applicable to all metals used in ferrites known to us and is inexpensive in view of the fact that the nitric acid introduced into the process is substantially all recovered for further use, and that, apart from the generally lower price of each metal compared with that of its oxide of comparable purity, iron, which forms the main constituent of many ferrites, can be employed in the form of scrap stampings, which are available to a specification at a very low price.

In order that the invention may be more readily understood, one method of manufacturing ferrite powder for manganese zinc ferrite Mn Zn ($Fe_2O_4$) will now be described, by way of example, with reference to the accompanying drawing, which is a flow sheet of this example.

EXAMPLE

The starting materials of the process comprise manganese metallic iron in the form of mild-steel scrap stampings sold to specification and zinc in the form of metal or, preferably, of zinc oxide, and sufficient nitric acid for their conversion to nitrates.

The manganese metal, the iron, and the zinc, the latter preferably wholly or partly as an aqueous dispersion of zinc oxide after its use in the absorption of NO from the tail gases of the nitric-acid recovery system described further below, are individually brought to solution in nitric acid to obtain nitrate solutions of known concentration. These solutions are then mixed in such proportions that the individual metals are present in the mixed nitrate solution in the desired proportions. This mixed solution is drop-fed or preferably spray-fed into a reactor to strike a surface maintained at a temperature of about 250° C ± 10° which is slightly above the decomposition temperature of the most stable one of the nitrates employed, and the area of heated surface in contact with the incoming nitrate solution is arranged to be sufficient to ensure decomposition of the nitrate without allowing any liquid to accumulate. This surface is provided on a bed of granular material constituted by a granular material which is an oxide mixture of ferrite material of the same composition as that which is required to be made by the process. The bed of granular material may be agitated by any suitable mechanical means, for example by means of paddles or of a screw conveyor. The arrangement of the conveyor or paddles in relation to the surface of the bed is preferably such that during operation the paddles or the conveyor remain substantially wholly beneath the surface of granular material.

In this manner an intimately mixed oxide powder containing some ferrite of spinel structure is obtained. The reactor is so constructed as to automatically discharge the powder and feed it into a heated calcination chamber, which is maintained at a temperature of 800° C. for a period of 17 minutes. This calcining treatment could if desired be carried out at some other temperature above 650° C. with corresponding adjustment of the period, but 800° is at present considered to be the most desirable temperature. This calcination chamber is fitted with a screw conveyor or other conveying means so operated as to maintain the mixture at this temperature for the time required for the powder leaving the calcination chamber to obtain the desired ferrite content to be suitable for final sintering after shaping, which in the specific example was a ferrite powder with 60 percent spinel structure and having the following composition in weight percent as determined by chemical analysis viz: $Fe_2O_3$ 71.0, ZnO 14.02, MnO 15.06.

The nitrous fumes, together with steam formed during the operation and the fumes from the solution stages are then led together with an excess of air or oxygen, to a nitric-acid recovery system, and the recovered nitric acid is re-used at the dissolving stage of the process. In the preferred form of the process, in which zinc oxide forms one of the starting materials, the tail gases of the recovery process are bubbled through an aqueous suspension of the zinc oxide to remove residual NO by conversion to $Zn(NO_2)_2$ and $Zn(NO_3)_2$, such conversion may take place according to the formula

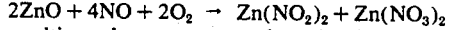
$$2ZnO + 4NO + 2O_2 \rightarrow Zn(NO_2)_2 + Zn(NO_3)_2$$

The resulting substances can replace the zinc or zinc oxide in the formation of zinc nitrate by treatment with nitric acid.

The accompanying drawing is a flow sheet of the example described. The raw materials, viz: iron scrap, manganese metal, and zinc oxide are supplied from three containers 1, 2, and 3 respectively. The metallic iron and manganese are each subjected to treatment with a solution of nitric acid, as indicated at 4 and thus converted respectively into an iron nitrate solution, stored in a reservoir 5, and a manganese nitrate solution, stored in a second reservoir 6. The zinc oxide from container 3 is eventually used to similarly produce a solution of zinc nitrate stored in a container 7, but before being subjected to the nitric-acid treatment of stage 4, it is first used for removal, in the first stage or stages of a nitric-acid recuperation system 12, of the residue of nitrous and nitric oxides from the nitration state 4 and from a calcining stage 9 to be referred to further below.

The solution of iron nitrate, manganese nitrate, and zinc nitrate from reservoirs 5, 6 and 7 respectively are fed in the molecular proportions corresponding to the composition of the ferrite powder required to be produced, in a mixing stage 8 where, due to the presence of each component in an aqueous solution, a very uniform distribution is achieved, and the mixed solution is sprayed in a hot reactor 9 in the presence of air on to a surface heated to 250° C., Which is somewhat above the decomposition temperature of the nitrate having the highest decomposition temperature of the three nitrates. Decomposition of the nitrates and evaporation of the solvent water are arranged to take place so rapidly that there is practically no chance of any unmixing. As a result a very uniform solid-oxide mixture, partly already in compound spinel structure, and having a quantitive composition corresponding to that of the ferrite powder to be produced is formed in granular form. This mixture is transferred in a continuous flow to a calcining stage 10, where at 800° C. the mutual reaction of the oxides is continued to the extent necessary for the material to leave this stage, after 17 minutes to be delivered at 11 in the form of a ferrite powder with 60 percent spinel structure and containing 71.0 percent by weight of $Fe_2O_3$, 14.02 percent by weight of ZnO and 15.06 percent by weight of MnO.

It will be readily appreciated by those skilled in the art that the process described by way of example requires modification if ferrites other than manganese-zinc ferrites are to be formed. Thus for example when it is required to form barium-strontium ferrite $(Ba, Sr) Fe_{12}O_{19}$, the reaction temperature for the decomposition should be preferably at least approximately 750° C.

The process according to the invention, more particularly in its preferred form, offers quite a number of advantages over various existing processes for the manufacture of ferrite powder. Thus the powder produced is reproducible with respect to composition, specific surface, and reactivity. The process is continuous and is controllable inasmuch as the solutions are perfectly miscible and in each solution a sample is consistently representative of the bulk. For similar reasons continuous analysis is possible. Furthermore the process is cheap: viz: the case of the specific example, the main constituent, viz: iron, is obtainable at a standard specification at an Apr. 1967 price of approximately £12 per ton whereas in Apr. 1967 iron oxide of similar purity cost £70 to £90 per ton. In contrast to the case of co-precipitation, no filtration or decantation is required, and the produce is delivered as a free-flowing powder. Furthermore the process of the invention is suitable for continuous operation, and it is applicable to all ferrites at present in commercial use because all nitrates are water-soluble and all are decomposible by heat. The only chemical reactant involved, namely nitric acid, is recirculated, thus minimising the cost of treatment chemicals, and finally the ferrites obtained are closely reproducible because there is less variation in the purity of the raw materials employed compared with the oxides which are used in the most commonly used ceramic process.

What we claim is:

1. A process for the production of powdered ferrite material, comprising the steps of making a mixed aqueous solution of nitrates of the various metals to be present in the ferrite, causing the mixed nitrate solution to be applied in the form of drops or droplets to the surface of a bed of granular material constituting a stoichiometric mixture of oxides of said metals while subjecting that bed to mixing agitation by mechanical stirring by a moving solid member while maintaining mutual contact of the granules, and maintaining said bed at a temperature above the decomposition point of the most stable nitrate present in the solution so that each drop or droplet becomes decomposed to form an intimate mixture of oxide powders without giving the more stable nitrates present in the solution a chance of becoming separated from the less stable nitrates, removing the resulting mixed powder at the rate at which such mixed powder is formed, and subjecting the removed mixed powder to further heat treatment to increase the ferrite content to a desired percentage.

2. A process as claimed in claim 1, wherein the step of applying the mixed nitrate solution to a bed of granular material is carried out in a reactor having mechanical mixing elements, and which includes the step of so controlling the removal of the mixed powder from the reactor as to maintain the mechanical mixing elements wholly beneath the surface of the bed of granular material.

3. A process as claimed in claim 1, wherein the further heat treatment is carried out in a heated calcination chamber and the mixture is, during this treatment, subjected to the action of a conveying means so as to maintain the granular condition of the mixture.

* * * * *